(12) United States Patent
Huang et al.

(10) Patent No.: US 8,170,864 B2
(45) Date of Patent: May 1, 2012

(54) METHOD AND APPARATUS FOR CAPTURING GRAPHIC USER INTERFACE RESOURCE OF AN APPLICATION

(75) Inventors: Xing Jiang Huang, Shanghai (CN); Wei Ji Shi, Shanghai (CN); Jun Yin, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 1115 days.

(21) Appl. No.: 12/013,524

(22) Filed: Jan. 14, 2008

(65) Prior Publication Data

US 2008/0295009 A1    Nov. 27, 2008

(30) Foreign Application Priority Data

May 24, 2007    (CN) .......................... 2007 1 0105502

(51) Int. Cl.
  *G06F 17/20*   (2006.01)
  *G06F 17/00*   (2006.01)
  *G06F 17/21*   (2006.01)
  *G06F 17/22*   (2006.01)
  *G06F 17/24*   (2006.01)
  *G06F 17/25*   (2006.01)
  *G06F 17/26*   (2006.01)
  *G06F 17/27*   (2006.01)
  *G06F 17/28*   (2006.01)

(52) U.S. Cl. ........................................... 704/8; 715/264
(58) Field of Classification Search .................. 715/739, 715/764; 707/E17.009
    See application file for complete search history.

(56) References Cited

U.S. PATENT DOCUMENTS 5,434,776 A * 7/1995 Jain ................................... 704/8

(Continued)

FOREIGN PATENT DOCUMENTS

CN        1364260 A1    8/2002

OTHER PUBLICATIONS

Gillam, "Developing global Applications in Java", 15th International Unicode Conference, San Jose, CA, Aug.-Sep. 1999, pp. 1-137.

(Continued)

*Primary Examiner* — Chat Do
*Assistant Examiner* — Stephen Alvesteffer
(74) *Attorney, Agent, or Firm* — Yee & Associates, P.C.; David A. Mims, Jr.

(57) ABSTRACT

A method and apparatus for capturing graphic user interface resource of an application, which method comprises: loading resource files in which visible text data in graphic user interfaces of the application are stored; duplicating the resource files; adding identification information to each visible text data unit in the resource files, the identification information being used to uniquely identify each visible text data unit in each of the resource files; capturing at least one panel of graphic user interface according to the graphic user interfaces of the application; and saving the duplicated resource files and the at least one captured panel as the graphic user interface resource of the application into an intermediate file. Advantageously, a linkage can be built up between the visible text data and the resource bundles by adding the unique identification information to each visible text data unit, and the application environment of the visible text data can be obtained by capturing the panels of graphic user interface of the application when the application is executed, so as to provide a basis for precise translation of the visible text data. There is also provided a method and apparatus for editing graphic user interfaces of an application.

14 Claims, 4 Drawing Sheets

U.S. PATENT DOCUMENTS

| | | | |
|---|---|---|---|
| 5,678,039 A * | 10/1997 | Hinks et al. | 1/1 |
| 5,974,372 A | 10/1999 | Barnes et al. | |
| 6,275,790 B1 | 8/2001 | Yamamoto et al. | |
| 6,311,151 B1 * | 10/2001 | Yamamoto et al. | 704/8 |
| 6,466,900 B1 * | 10/2002 | Lissauer et al. | 704/7 |
| 6,735,759 B1 | 5/2004 | Yamamoto et al. | |
| 6,904,563 B2 | 6/2005 | Kumhyr et al. | |
| 2002/0177993 A1 * | 11/2002 | Veditz et al. | 704/8 |
| 2004/0205721 A1 * | 10/2004 | Colaiuta | 717/124 |
| 2006/0167831 A1 * | 7/2006 | Kamppari | 707/1 |
| 2007/0179775 A1 * | 8/2007 | Bauman et al. | 704/8 |

OTHER PUBLICATIONS

Robling, "Translator: A Package for Internationalization for Java-Based Applications and GUIs", ITiCSE'06, Jun. 26-28, 2006, Bologna, Italy, ACM.

* cited by examiner

Fig. 4

METHOD AND APPARATUS FOR CAPTURING GRAPHIC USER INTERFACE RESOURCE OF AN APPLICATION

TECHNICAL FIELD OF THE INVENTION

The present invention relates to computer technology field, particularly to a processing of Graphic User Interfaces (GUIs) of an application during internationalization of the application, and more particularly to a method and apparatus for capturing graphic user interface resource of the application and a method and apparatus for editing the graphic user interfaces of the application.

BACKGROUND OF THE INVENTION

To meet requirements of internationalization of applications, all visible text data in GUIs of the applications should be translated into different languages. In general, in an application, visible text data are separated from binary codes and stored in resource files individually. When the application is executed, the application logic will retrieve the corresponding visible text data from the resource files according to user locales and show them in the GUIs of the application.

Usually, a resource file can be a Program Integrated Information (PII) file. The so-called program integrated information means user-visible text in a software program and the visible text can be accessible only by executing the software program or using the software program. The program integrated information generally contains user interface text, messages, help information, intelligent agents, coaches, etc., and is used to guide users to complete complex tasks.

In addition, the resource file can be a resource bundle of Java property file, a resource bundle of XML, and so on.

During the current internationalization of applications, at first, when developing an application, developers collect the necessary visible text data in the GUIs of the application and put them into the resource files. And then, these resource files are sent to translators and are translated into different languages.

However, such technical solution would have the following problems:

1. When collecting the visible text data, sometimes the developers may forget to put some visible text data into the resource files due to cursoriness, so that the text data will not be translated. Such a mistake may not be found until late test cycles.

2. When the translators translate a single string in the resource file, because of unawareness of the application environment of the string, i.e. context, the translators cannot translate it precisely, especially when the string has multiple meanings. And such a mistake may not be found until the Translation Verification Test (TVT).

The Translation Verification Test (TVT) is used to reduce the translation related problems. Usually many testers from different countries or regions will take part in the TVT process. The developers should build up different test environments for the testers from different countries or regions and write TVT test cases to ensure that all the translatable text data are translated correctly. As a result, the developers will spend a lot of time and efforts to collaborate with the testers and maintain the massive test environments.

U.S. Pat. No. 5,974,372 "Graphical User interface (GUI) Language Translator" discloses a method for translating strings presented in the GUIs which is performed in a WINDOWS platform. In this method, the strings in the GUIs are intercepted by means of a Windows Hook technique and putted into a temporary table. And then the user can translate the strings in the temporary table. However, the method can be only used for the Windows applications. Only the strings in the GUIs, rather than the sources of the strings, are recorded. In this way, the same translation may be used for the strings having multiple meanings in different application environments, resulting in the imprecise translation.

U.S. Pat. No. 6,735,759 "Editing system for translating displayed user language using a wrapper class" discloses a method enabling translators to modify the displayed strings in the running interfaces of the application directly. However, the method requires the developers to develop a series of Java classes specific for supporting the direct modifications to the strings in the controls in the user interfaces, and introduces a big variation to the traditional internationalization method of the applications.

U.S. Pat. No. 6,904,563 "Editing Platforms for Remote User interface Translation" discloses a method of translating the user interfaces, in which the program interfaces are captured when the application is executed and the captured program interfaces can be presented in a different place where the user can edit the strings in the interfaces. However, the method needs to monitor changes of the program interfaces using a background process and records the related information of a control when the control is created through the background process. So the program developers will write a lot of additional codes.

SUMMARY OF THE INVENTION

The present invention is directed to above technical problems, and its objective is to provide a method and apparatus for capturing graphic user interface resource of an application, and a method and apparatus for editing graphic user interfaces of an application, which can solve the problems that the visible text data may be forgotten to be translated or may be mistranslated in the prior art, and does not require program developers to write a great deal of additional codes.

According to first aspect of the present invention, it is provided with a method for capturing graphic user interface resource of an application, which comprises: loading resource files in which visible text data in graphic user interfaces of the application are stored; duplicating the resource files; adding identification information to each visible text data unit in the resource files, the identification information being used to uniquely identify each visible text data unit in each of the resource files; capturing at least one panel of graphic user interface according to the graphic user interfaces of the application; and saving the duplicated resource files and the at least one captured panel as graphic user interface resource of the application into an intermediate file.

According to second aspect of the present invention, it is provided with an apparatus for capturing graphic user interface resource of an application, which comprises: a loader for loading resource files in which visible text data in the graphic user interfaces of the application are stored; a duplicator for duplicating the resource files; an identification information adder for adding identification information to each visible text data unit in the resource files, the identification information being used to uniquely identify each visible text data unit in each of the resource files; a panel capturer for capturing at least one panel of graphic user interface according to the graphic user interfaces of the application; and a saving unit for saving the duplicated resource files and the at least one captured panel as graphic user interface resource of the application into an intermediate file.

According to third aspect of the present invention, it is provided with a method for editing graphic user interfaces of an application, which comprises: presenting the graphic user interfaces of the application according to an intermediate file, wherein the intermediate file includes graphic user interface data of the application generated when the application is executed and resource files in which visible text data in the graphic user interfaces of the application are stored; allowing a user to edit the visible text data presented in each panel of graphic user interface; and saving the edited panels of graphic user interface into the intermediate file.

According to fourth aspect of the present invention, it is provided with an apparatus for editing graphic user interfaces of an application, which comprises: a presentation unit for presenting the graphic user interfaces of the application according to an intermediate file, wherein the intermediate file includes graphic user interface data of the application generated when the application is executed and resource files in which visible text data in the graphic user interfaces of the application are stored; an editing unit for allowing a user to edit the visible text data presented in each panel of graphic user interface; and a saving unit for saving the edited panels of graphic user interface into the intermediate file.

DETAILED DESCRIPTION OF THE PREFERRED EMBODIMENT

It is believed that the above and other objectives, features and advantages of the present invention will become clearer through the following detailed description of the embodiments of the present invention in conjunction with the drawings.

Figure 1:
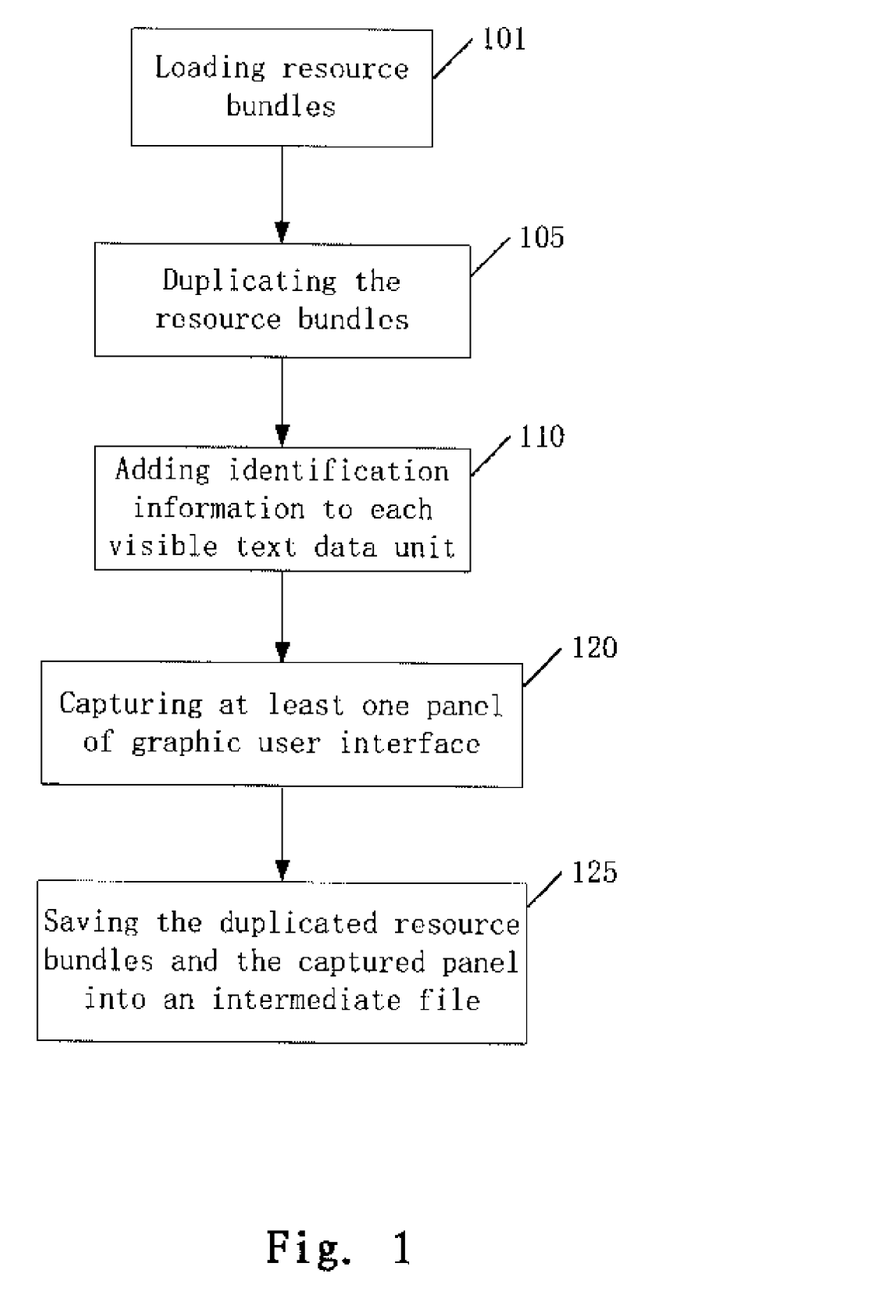
FIG. 1 is a flowchart of a method for capturing graphic user interface resource of an application according to one embodiment of the present invention.

FIG. 1 is a flowchart of a method for capturing graphic user interface (GUI) resource of an application according to one embodiment of the present invention. This embodiment will be described in detail in conjunction with the figure.

As shown in FIG. 1, at Step 101, resource files, in which visible text data in the GUIs of the application are stored, are loaded. As described in the Background of the Invention, the resource file can be the program integrated information (PII) file, the resource bundle of Java property file, or the resource bundle of XML, etc.

In this embodiment, the resource bundle of Java property file is used as the resource file. For example, in a resource bundle, it is recorded that:

```
......
hint = {0} rules selected.
button.title = OK
......
``` which indicates that a prompt "X X rules selected." and a button "OK" would be presented in a panel of GUI. In the resource bundle, "hint" and "button.title" are resource keywords, and "rules selected" and "OK" are the visible text data.

At Step 105, the loaded resource bundles are duplicated to obtain a copy of the original resource bundles. Then at Step 110, identification information is added to each visible text data unit in the resource bundles, wherein the identification information is used to uniquely identify each visible text data unit in each of the resource files and can indicate which visible data unit in which resource bundle the visible text data come from. Here a visible text data unit comprises a resource keyword and visible text data.

To avoid influencing the presentation of the GUIs, in this embodiment, the identification information is invisible. An example of adding the identification information is provided as below.

At first, at least one character is determined to be used in the identification information. Here, three invisible characters can be determined, such as

U+200B ZERO WIDTH SPACE;
U+200C ZERO WIDTH NON-JOINER;
U+200D ZERO WIDTH JOINER.

These three characters can be used as separators for separating the visible text data from an identifier described later, wherein "U+200B ZERO WIDTH SPACE" is treated as "=", "U+200C ZERO WIDTH NON-JOINER" is treated as "0" and "U+200D ZERO WIDTH JOINER" is treated as "1".

Next, a unique identifier is generated for each visible text data unit in the resource bundles. Then, the identifier is added to the visible text data of the corresponding visible text data unit. The visible text data and the identifier are separated from each other by the determined separators.

For instance, in the above example, the visible text data with the identification information is "{0} rules selected.=1100010011000100". And in the resource bundle, the visible text data unit is accordingly amended as hint = {0} rules selected. =1100010011000100

By adding the unique identification information to each visible text data unit, a linkage can be built up between the visible text data and the resource bundles so that source of each visible text data can be tracked, and any modification on the visible text data in the GUIs can be reflected to the change of the corresponding visible text data in the resource bundles.

Although one kind of identification information and one embodiment about how to add the identification information are provided here, it can be known for persons skilled in the art that other kind of identification information and other implementations of adding the identification information can be employed.

In addition, the identification information can be visible. Thus the identification information can be displayed in the GUIs.

Then, at Step 120, according to the GUIs of the application, at least one panel of GUI is captured. In this embodiment, the identification information is invisible in the GUIs, so only visible text data are presented in the GUIs.

Specifically, the currently presented panel is monitored to determine whether there are the visible text data. If there are the visible text data, the structure of the currently presented panel is captured and all controls in the panel and the visible text data with the identification information within each of the control are recorded. If there is no visible text data, the panel is skipped over and the subsequently presented panel would be monitored to determine whether there are the visible text data. After the currently presented panel is captured, according to the generated GUI hierarchy, the structures of the descendent panels of the currently captured panel are captured and all controls in these descendent panels and the visible text data with the identification information within each of the controls are recorded.

Alternatively, the capturing of the panels of GUI can be triggered by a user. Specifically, an event listener for launching the capturing of the panel is set in each of the generated panels of GUI and the event listener is detected whether it is triggered by the user. If the event listener in a panel is triggered, which indicates that the user wants to capture the panel, the structure of the panel is captured and all controls and the visible text data with the identification information within each of the controls are recorded. If the event listener is not triggered, the panel is skipped over and the event listener in the subsequent panel is detected whether it is triggered. After the panel is captured, according to the generated GUI hierarchy, the structures of the descendent panels of the currently captured panel are captured and all controls in these descendent panels and the visible text data with the identification information within each of the controls are recorded.

Step 120 is repeated until all the generated panels of GUI are processed correspondingly.

Finally, at Step 125, the duplicated resource bundles and the at least one captured panel are saved as the GUI resource of the application into an intermediate file. That is, the GUI resource includes the original resource bundles and the panels of GUI of the application, and is saved into the intermediate file.

It can be seen from above description that the method for capturing GUI resource of an application of this embodiment can build up a linkage between the visible text data and the resource bundles by adding the unique identification information to each visible text data unit, and can obtain the application environment of the visible text data by capturing the panels of GUI of the application when the application is executed, so as to provide a basis for precise translation of the visible text data.

In addition, in the specific implementation, the codes associated with the operations on the resource files and the operations on the event listener can be inserted in advance into the application by instrumentation. Then, when the application is executed, the GUIs of the application can be analyzed automatically by the codes. Thus the developers do not write a great of additional codes.

Figure 2:
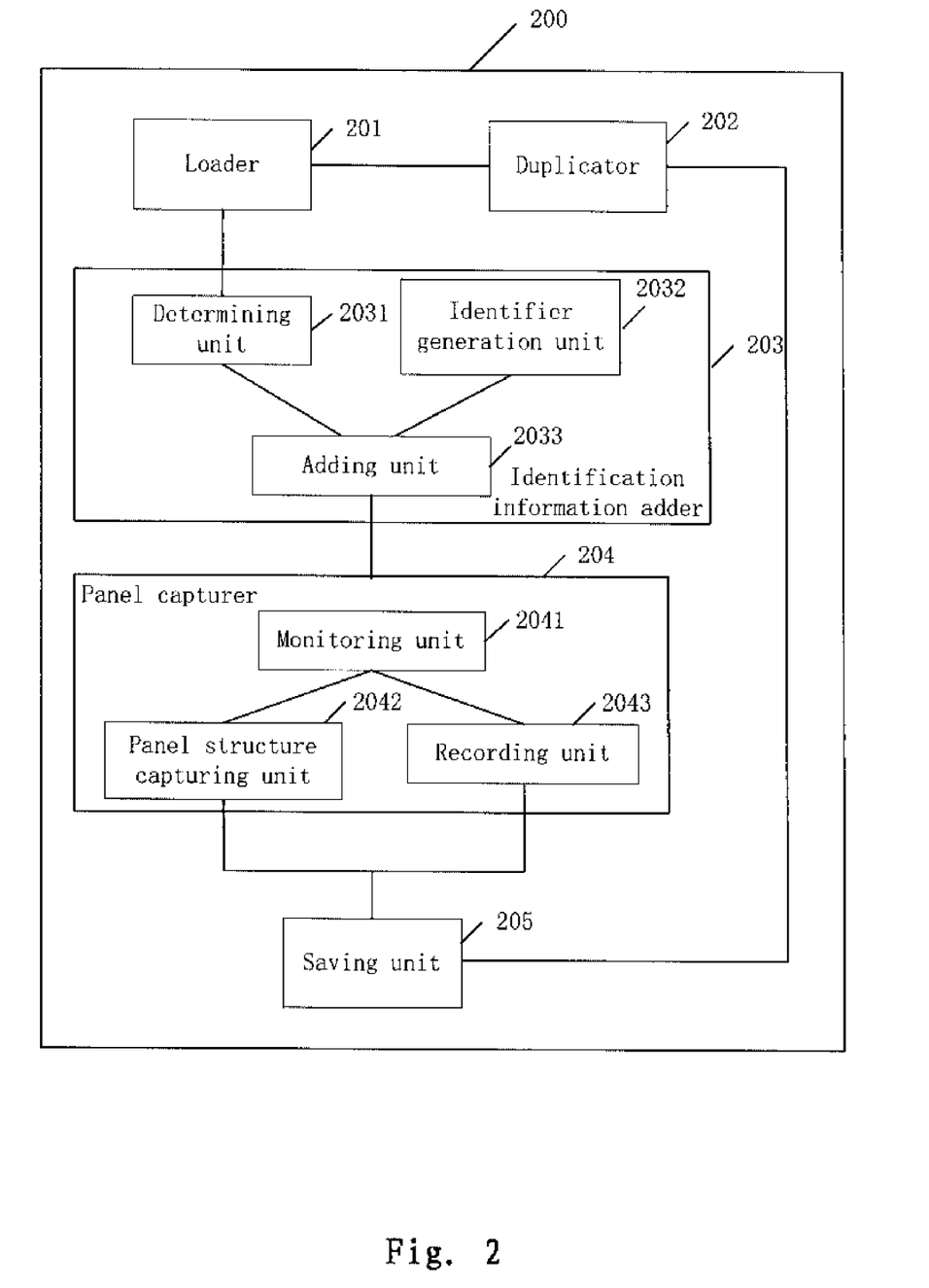
FIG. 2 is a block diagram of an apparatus for capturing graphic user interface resource of an application according to one embodiment of the present invention.

Under the same inventive concept, FIG. 2 is a structural block diagram of an apparatus for capturing GUI resource of an application according to one embodiment of the present invention. This embodiment will be described in detail in conjunction with the figure. The descriptions of the portions which are same as those of the previous embodiment are omitted properly.

As shown in FIG. 2, the apparatus 200 for capturing GUI resource of an application of this embodiment comprises: a loader 201 for loading resource files in which visible text data in the GUIs of the application are stored; a duplicator 202 for duplicating the resource files; an identification information adder 203 for adding identification information to each visible text data unit in the resource files, the identification information being used to uniquely identify each visible text data unit in each of the resource files; a panel capturer 204 for capturing at least one panel of GUI according to the GUIs of the application; and a saving unit 205 for saving the duplicated resource files and the at least one captured panel as GUI resource of the application into an intermediate file.

As described in the above, the resource file can be the program integrated information (PII) file, the resource bundle of Java property file, or the resource bundle of XML, etc. In this embodiment, the resource bundle of Java property file is used as the resource file.

When the loader 201 loads the resource bundles in which the visible text data are stored, the duplicator 202 can duplicate the loaded resource bundles to obtain a copy of the original resource bundles.

Then, the identification information adder 203 adds the identification information to each visible text data unit. As described in the above, the identification information is used to uniquely identify each visible text data unit in each of the resource files and can indicate which visible data unit in which resource bundle the visible text data come from.

In this embodiment, in the identification information adder 203, a determining unit 2031 determines at least one character as a separator. In this embodiment, three invisible characters are determined, such as "U+200B ZERO WIDTH SPACE" (treated as "="), "U+200C ZERO WIDTH NON-JOINER" (treated as "0"), and "U+200D ZERO WIDTH JOINER" (treated as "1"). Then, in an identifier generation unit 2032, a unique identifier is generated for each visible text data unit in the resource bundles. And the identifier is added to the visible text data of the corresponding visible text data unit by an adding unit 2033. Further, the visible text data and the identifier are separated by the separators determined by the determining unit 2031.

After the unique identification information is added to each visible text data unit by the identification information adder 203, the visible text data in the resource bundles become the visible text data with the identification information. A linkage can be built up between the visible text data and the resource bundles by means of the identification information, so that the sources of the visible text data can be tracked and the modification on the visible text data in the GUIs can be reflected to the change of the corresponding visible text data in the resource bundles.

Although an example of the identification information adder and one kind of identification information are described in the embodiment, persons skilled in the art can use other kind of identification information or other implementations of the identification information adder.

Then, the panel capturer 204 captures each panel of GUI according to the GUIs of the application. In this embodiment, the identification information is invisible and thus only visible text data are presented in the GUIs.

Specifically, in the panel capturer 204, a monitoring unit 2041 monitors whether there are the visible text data in the currently presented panel. If there are the visible text data in the currently presented panel, the monitoring unit 2041 triggers a panel structure capturing unit 2042 through control signal to capture the structure of the currently presented panel as well as the structures of its descendent panels. All controls in the currently presented panel and its descendent panels and the visible text data with the identification information within each of the controls are recorded by a recording unit 2043.

If there is no visible text data in the currently presented panel, the monitoring unit 2041 monitors the subsequently presented panel of GUI.

Alternatively, a user can trigger the panel capturer 204 to capture the panel of GUI. In this case, the apparatus 200 for capturing GUI resource of an application of this embodiment further comprises an event listener for launching the capturing of the panel, which is set in each panel of GUI.

Specifically, when the event listener of a panel is triggered by the user, the panel structure capturing unit 2042 of the panel capturer 204 captures the structure of the currently presented panel as well as the structures of its descendent panels. Then the recording unit 2043 records all controls in the currently presented panel and its descendent panels and the visible text data with the identification information within each of the controls.

After each of the generated panels of GUI has been processed, the saving unit 205 saves the duplicated resource bundles and the captured panels as the GUI resource into an intermediate file, i.e. the GUI resource includes the original resource bundles and the generated panels of GUI of the application, and is saved into the intermediate file.

The apparatus 200 for capturing GUI resource of an application of this embodiment and its components can be implemented by hardware circuit such as Very Large Scale Integrated Circuit or gate array, semiconductor such as logic chips and transistors, or programmable hardware device such as field programmable gate array, programmable logic device, and by software executing on various types of processors, and by the combination of above hardware circuit and software. Moreover, the apparatus 200 for capturing GUI resource of an application of this embodiment can operationally perform the method for capturing GUI resource of an application as shown in FIG. 1.

It can be seen from above description that the apparatus 200 for capturing GUI resource of an application of this embodiment can build up a linkage between the visible text data and the resource bundles by adding the unique identification information to each visible text data unit, and can obtain the application environment of the visible text data by capturing the panels of GUI of the application when the application is executed, so as to provide a basis for precise translation of the visible text data.

Figure 3:
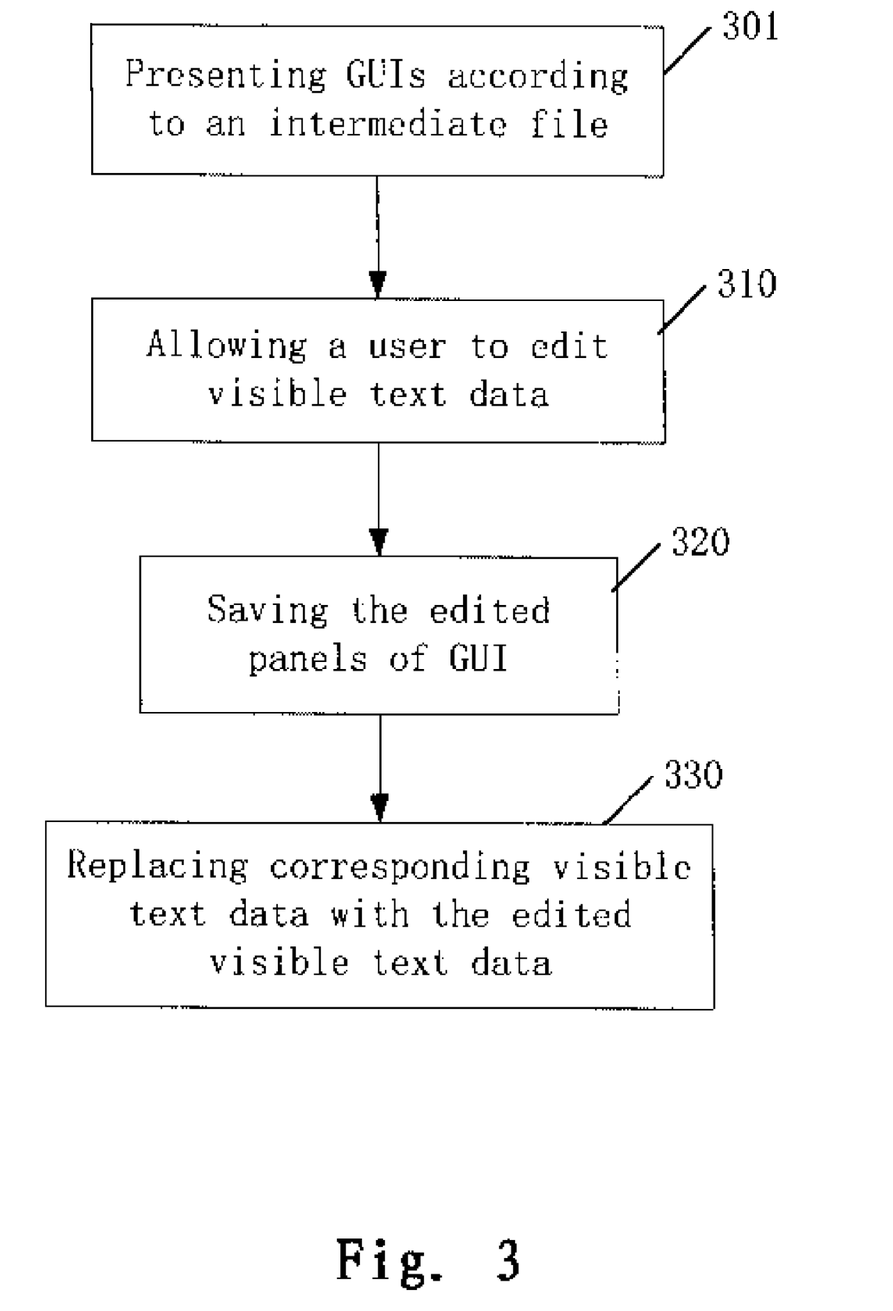
FIG. 3 is a flowchart of a method for editing graphic user interfaces of an application according to one embodiment of the present invention.

Under the same inventive concept, FIG. 3 is a flowchart of a method for editing graphic user interfaces of an application according to one embodiment of the present invention. This embodiment will be described in detail in conjunction with the figure. The descriptions of the portions which are same as those in previous embodiments are omitted properly.

As shown in FIG. 3, at Step 301, GUIs of the application are presented according to an intermediate file, wherein the intermediate file includes GUI data of the application generated when the application is executed and resource files in which visible text data in the GUIs of the application are stored. Moreover, the intermediate file can be generated using the method for capturing GUI resource of an application as shown in FIG. 1.

Firstly, the intermediate file is read by, for example, a computer to obtain the GUI data of the application and the resource files. Then each of the panels of GUI is reproduced, wherein the visible text data in these panels have the identification information which is used to uniquely identify each visible text data unit in each of the resource files.

Then, at Step 310, the user is allowed to edit the visible text data in each of the presented panels of GUI. For example, in the above example, the prompt "1,234 rules selected." and the button "OK" are shown in a presented panel of GUI, and the user can translate the prompt and the button directly into "选择了1.234 条规则。" and "确定in the panel.

Then, at Step 320, the edited panel of GUI is saved into the intermediate file. Now, in the panel of GUI saved in the intermediate file, the prompt is changed to "选择了1.234 条规则。" and the button is change to "确定".

In addition, at Step 330, the visible text data in the resource bundle are replaced with the corresponding edited visible text data. According to the identification information, it is easy to find the source of the visible text data in the panel of GUI. Thus the edited visible text data can be saved in the resource bundle. In this case, in the above example, the resource bundle is amended as:

......
hint = 选择了 {0} 条规则。
button.title = 确定
......

It can be seen from above description that the visible text data can be translated precisely and the problem that the visible text data may be forgotten to be translated will be eliminated by using the method for editing GUIs of an application of this embodiment since the translators can know the application environment of the visible text data. In addition, the modification on the visible text data in the GUIs of the application can be correspondingly reflected in the resource bundles.

During the internationalization of the application, the method for capturing GUI resource of an application as shown in FIG. 1 and the method for editing GUIs of an application as shown in FIG. 3 can be used individually or combined together.

In the development of the application, the GUI resource of the application is saved into the intermediate file by using the method for capturing GUI resource of an application as shown in FIG. 1. When the visible text data are to be translated, the intermediate file is transferred to the translators. During the translation, the translators can use the method for editing GUIs of an application as shown in FIG. 3.

Figure 4:
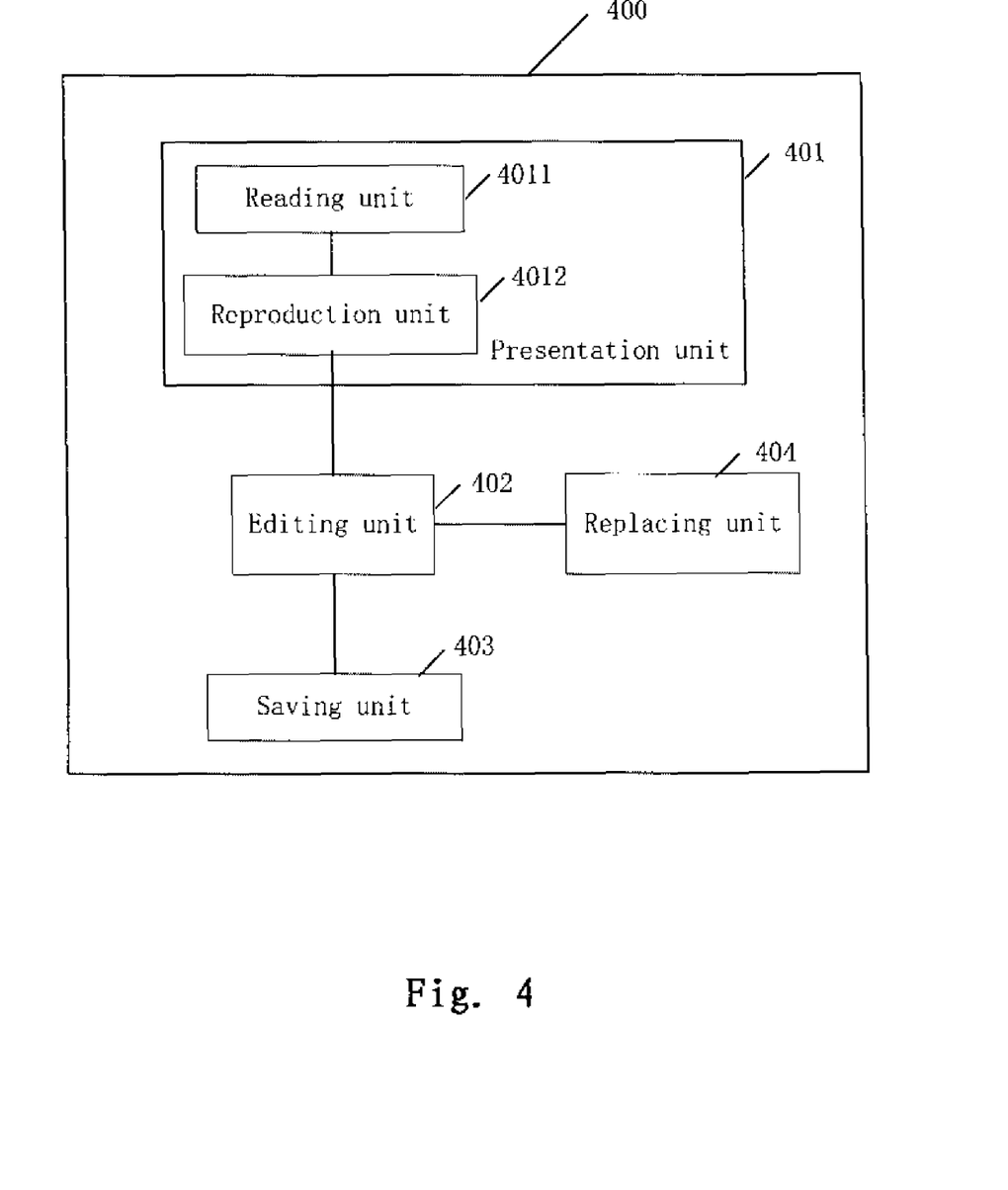
FIG. 4 is a block diagram of an apparatus for editing graphic user interfaces of an application according to one embodiment of the present invention.

Under the same inventive concept, FIG. 4 is a structural block diagram of an apparatus for editing GUIs of an application according to one embodiment of the present invention. This embodiment will be described in detail in conjunction with the figure. The descriptions of the portions which are same as those in previous embodiments are omitted properly.

As shown in FIG. 4, the apparatus 400 for editing GUIs of an application of this embodiment comprises: a presentation unit 401 for presenting the GUIs of the application according to an intermediate file, wherein the intermediate file includes GUI data of the application and resource files in which visible text data in the GUIs of the application are stored; an editing unit 402 for allowing a user to edit the visible text data presented in each of the presented panels of GUI; and a saving unit 403 for saving the edited panels of GUI into the intermediate file.

In this embodiment, in the presentation unit 401, a reading unit 4011 reads the intermediate file to obtain the GUI data of the application and the resource files. Then, each of the panels of GUI is reproduced by a reproduction unit 4012, wherein the visible text data in these panels have the identification information which is used to uniquely identify each visible text data unit in each of the resource files.

Then, the visible text data in each of the panels of GUI is edited by the editing unit 402. The edited panel of GUI is saved into the intermediate file by the saving unit 403.

In addition, the apparatus 400 for editing GUIs of an application of this embodiment can further comprises a replacing unit 404 for replacing the corresponding visible text data in the resource file with the edited visible text data.

The apparatus 400 for editing GUIs of an application of this embodiment and its components can be implemented by hardware circuit such as Very Large Scale Integrated Circuit or gate array, semiconductor such as logic chips and transistors, or programmable hardware device such as field programmable gate array, programmable logic device, and by software executing on various types of processors, and by the combination of above hardware circuit and software. Moreover, the apparatus 400 for editing GUIs of an application of this embodiment can operationally perform the method for editing GUIs of an application as shown in FIG. 3.

It can be seen from above description that the visible text data can be translated precisely and the problem that the visible text data may be forgotten to be translated will be eliminated by using the apparatus 400 for editing GUIs of an application of this embodiment, since the translators can know the application environment of the visible text data. In addition, the modification on the visible text data in the GUIs of the application can be correspondingly reflected in the resource bundles.

Although the method and apparatus for capturing graphic user interface resource of an application and the method and apparatus for editing graphic user interfaces of an application are described in detail in conjunction with the preferred embodiment, the present invention is not limited as above. It should be understood for persons skilled in the art that the above embodiments may be varied, replaced or modified without departing from the spirit and the scope of the present invention.

The invention claimed is:

1. A method for capturing graphic user interface resource of an application, comprising steps implemented by a computer of:
   the computer loading at least one resource file in which visible text data in graphic user interfaces of the application are stored;
   the computer duplicating the at least one resource file;
   the computer adding identification information to each visible text data unit that is contained in the at least one resource file, the identification information being used to uniquely identify each visible text data unit in each of the at least one resource file;
   the computer capturing at least one currently presented panel of graphic user interface according to the graphic user interfaces of the application, wherein the capturing step comprises monitoring whether there is the visible text data in a currently presented panel, and if there is the visible text data: (i) capturing structure of the currently presented panel and recording all controls in the currently presented panel and the visible text data with the identification information within each of the controls, (ii) capturing structures of descendent panels of the currently presented panel according to graphic user interface hierarchy, and (iii) recording all controls in the descendent panels and the visible text data with the identification information within each of the controls;
   the computer saving the duplicated at least one resource file and the at least one captured panel as the graphic user interface resource of the application into an intermediate file;
   presenting the graphic user interfaces of the application according to the intermediate file, wherein the intermediate file includes graphic user interface data of the application generated when the application is executed and the duplicated at least one resource file in which the visible text data in the graphic user interfaces of the application are stored;
   editing the visible text data presented in each panel of graphic user interface to form edited panels of graphic user interface; and
   saving the edited panels of graphic user interface into the intermediate file.

2. The method according to claim 1, wherein the step of adding identification information comprises:
   determining at least one character as separator;
   generating a unique identifier for each visible text data unit in the at least one resource file; and
   adding the identifier to the visible text data of the visible text data unit and separating the visible text data from the identifier using the separator.

3. The method according to claim 2, wherein the separator is invisible in the graphic user interfaces of the application.

4. The method according to claim 1, further comprising:
   setting an event listener in each of the panels of graphic user interface for launching to capture the panel;
   wherein the capturing step comprises:
   detecting whether the event listener is triggered by a user;
   in response to the event listener being triggered by the user, capturing structure of a currently presented panel and recording all controls in the currently presented panel and the visible text data with the identification information within each of the controls; and
   capturing structures of descendent panels of the currently presented panel according to a graphic user interface hierarchy, and recording all controls in the descendent panels and the visible text data with the identification information within each of the controls.

5. The method according to claim 4, further comprising:
   inserting a code associated with an operation on the at least one resource file and an operation on the event listener into the application by instrumentation.

6. The method according to claim 4, further comprising:
   presenting the graphic user interfaces of the application according to the intermediate file, wherein the intermediate file includes graphic user interface data of the application generated when the application is executed and the at least one resource file in which the visible text data in the graphic user interfaces of the application are stored;
   editing the visible text data presented in each panel of graphic user interface to form edited panels of graphic user interface; and
   saving the edited panels of graphic user interface into the intermediate file.

7. The method according to claim 1, wherein the presenting step comprises:
   reading the intermediate file to obtain the graphic user interface data and the at least one resource file; and
   reproducing each panel of graphic user interface.

8. The method according to claim 1, further comprising:
   replacing the corresponding visible text data in the at least one resource file with the edited visible text data.

9. A machine for capturing graphic user interface resource of an application, comprising:
   a loader for loading at least one resource file in which visible text data in graphic user interfaces of the application are stored;
   a duplicator for duplicating the at least one resource file;
   an identification information adder for adding identification information to each visible text data unit that is contained in the at least one resource file, the identification information being used to uniquely identify each visible text data unit in each of the at least one resource file;

a panel capturer for capturing at least one currently presented panel of graphic user interface according to the graphic user interfaces of the application, wherein the panel capturer comprises a monitoring unit for monitoring whether there is the visible text data in a currently presented panel, a panel structure capturing unit for capturing structures of the currently presented panel and descendent panels of the currently presented panel when there is the visible text data, and a recording unit for recording all controls in the currently presented panel and its descendent panels and the visible text data with the identification information within each of the controls;

a saving unit for saving the duplicated at least one resource file and the at least one captured panel as the graphic user interface resource of the application into an intermediate file on a storage device;

a presentation unit for presenting the graphic user interfaces of the application according to the intermediate file, wherein the intermediate file includes graphic user interface data of the application and the at least one resource file in which the visible text data in the graphic user interfaces of the application are stored;

an editing unit for editing the visible text data presented in each panel of graphic user interface to form edited panels of the graphic user interface; and a saving unit for saving the edited panels of graphic user interface into the intermediate file.

10. The machine according to claim 9, wherein the identification information adder comprises:

a determining unit for determining at least one character as separator;

an identifier generation unit for generating a unique identifier for each visible text data unit in the at least one resource file; and an adding unit for adding the identifier to the visible text data of the visible text data unit and separating the visible text data from the identifier using the separator.

11. The machine according to claim 9, further comprising:

an event listener for launching to capture the panel, which is set in each of the panels of graphic user interface;

wherein the panel capturer further comprises:

a panel structure capturing unit, responsive to the event listener being triggered by a user, for capturing structures of a currently presented panel and its descendent panels; and a recording unit for recording all controls in the currently presented panel and the descendent panels and the visible text data with the identification information within each of the controls.

12. The apparatus according to claim 11, further comprising:

a presentation unit for presenting the graphic user interfaces of the application according to the intermediate file, wherein the intermediate file includes graphic user interface data of the application and the at least one resource file in which the visible text data in the graphic user interfaces of the application are stored;

an editing unit for editing the visible text data presented in each panel of graphic user interface to form edited panels of the graphic user interface; and a saving unit for saving the edited panels of graphic user interface into the intermediate file.

13. The machine according to claim 9, wherein the presentation unit comprises:

a reading unit for reading the intermediate file to obtain the graphic user interface data of the application and the at least one resource file; and a reproduction unit for reproducing each panel of graphic user interface.

14. The machine according to claim 9, further comprising:

a replacing unit for replacing the corresponding visible text data in the at least one resource file with the edited visible text data.

* * * * *